United States Patent
Cheng et al.

(10) Patent No.: US 8,847,912 B2
(45) Date of Patent: Sep. 30, 2014

(54) GYROSCOPIC INPUT SYSTEMS AND METHODS

(75) Inventors: Sandie Ning Ning Cheng, Cypress, TX (US); Dustin L. Hoffman, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 297 days.

(21) Appl. No.: 13/386,942

(22) PCT Filed: Sep. 9, 2009

(86) PCT No.: PCT/US2009/056302
§ 371 (c)(1),
(2), (4) Date: Jan. 25, 2012

(87) PCT Pub. No.: WO2011/031256
PCT Pub. Date: Mar. 17, 2011

(65) Prior Publication Data
US 2012/0120022 A1    May 17, 2012

(51) Int. Cl.
G06F 3/045 (2006.01)
G06F 3/0346 (2013.01)
G01L 1/08 (2006.01)
G01C 19/56 (2012.01)

(52) U.S. Cl.
CPC .............. *G01C 19/56* (2013.01); *G06F 3/0346* (2013.01); *G01L 1/08* (2013.01)
USPC ............................. 345/174; 345/158; 345/173

(58) Field of Classification Search
CPC .. G01C 21/00; G01C 19/5776; G01C 21/206; G01C 21/34; G01C 25/00; G01C 5/06; G01C 9/06; A63F 13/00; A63F 13/06; G06F 17/5036; G06F 3/041; G06F 13/102; G06F 17/00; G06F 17/30283; G06F 17/303
USPC ......... 345/156, 158, 173, 174, 581, 650, 660, 345/8; 348/E7.083, E5.078, E5.099, 118, 348/14.08, 159, 208.11, 208.5; 700/259, 700/245
See application file for complete search history.

(56) References Cited

U.S. PATENT DOCUMENTS

2002/0149571 A1*  10/2002  Roberts ...................... 345/174

FOREIGN PATENT DOCUMENTS

| JP | 08-094554 | 4/1996 |
| JP | 11-304834 | 11/1999 |
| KR | 10-2009-0088501 | 8/2009 |

OTHER PUBLICATIONS

International Searching Authority, International Search Report and Written Opinion, Application No. PCT/US2009/056302, Date of Mailing Jun. 9, 2010, 10 p.

* cited by examiner

*Primary Examiner* — Kevin M Nguyen
*Assistant Examiner* — Kenneth B Lee, Jr.

(57) ABSTRACT

Gyroscopic input systems and methods are provided. A gyroscopic input apparatus (100) can include a rigid surface (110) having an aperture (120) disposed therein. An input surface (130) can be flexibly attached to the rigid surface via a flexible member (140). The input surface can be disposed proximate at least a portion of the aperture. A gyroscopic sensor (150) can be operatively connected to the input surface.

15 Claims, 4 Drawing Sheets

GYROSCOPIC INPUT SYSTEMS AND METHODS

BACKGROUND OF THE INVENTION

Description of the Related Art

A gyroscope is an instrument consisting of a mass spun rapidly about an axis like a top. The angular momentum of the mass causes it to resist changes in the direction of its axis of rotation, due to the principle of conservation of angular momentum. Because of the gyroscope's tendency to remain oriented in one direction, it can be used to detect displacement along any of the three orthogonal axes passing through the mass. These three orthogonal axes are often referred to as, the x, y, and z axes. Incorporation of a gyroscope into a sensor provides a device capable of producing signals proportionate to the magnitude of the displacement along any of the three orthogonal axes.

SUMMARY OF THE INVENTION

Gyroscopic input systems and methods are provided. A gyroscopic input apparatus can include a rigid surface having an aperture disposed therein. An input surface can be flexibly attached to the rigid surface via a flexible member. The input surface can be disposed proximate at least a portion of the aperture. A gyroscopic sensor can be operatively connected to the input surface.

A gyroscopic input system is also provided. The system can include a rigid surface having an aperture disposed therein. An input surface can be disposed proximate at least a portion of the aperture, flexibly attached to the rigid surface via a flexible member. A gyroscopic sensor can be operatively connected to the input surface adapted to provide a sensor output. A controller can be communicatively coupled to the gyroscopic sensor configured to receive the sensor output.

Finally, a gyroscopic input method is also provided. The method can include applying an input force to an input surface in at least two orthogonal directions. The input surface can be at least partially disposed within an aperture formed within a rigid surface and a gyroscopic device can be disposed proximate the input surface. The method can further include transmitting a sensor output from the gyroscopic device to a controller. At least a portion of the sensor output can be proportionate to the direction of the input force. At least a portion of the sensor output can be proportionate to the magnitude of the input force.

As used herein, items that have an "operable connection", or items referred to as "operably connected", are items in which signals, physical communications, physical motion, physical displacement, and/or logical communications may be sent and/or received. Typically, an operable connection includes a physical interface, an electromechanical interface, an electrical interface, or a data interface, but it is to be noted that an operable connection may include differing combinations of these or other types of connections sufficient to allow operable control or communication between the items. In one illustrative example, two entities can be physically operably connected by mere proximity, or by some form of electrical, mechanical, or chemical bonding. In another illustrative example, two entities can be electrically operably connected by being able to communicate signals to each other directly or through one or more intermediate entities like a processor, operating system, logic, software, or other entity. Logical and/or physical communication channels can be used to create an operable connection.

As used herein, items that are "communicatively coupled" or simply "coupled" can refer to items that share form of direct, indirect, optical or wireless electrical connection. The electrical connection can, in one or more embodiments, include, but is not limited to any electrically conductive or magnetically inductive connection linking two or more devices. The connection can be electrically conductive, for example using one or more conductors such as copper or aluminum wire, conductive strips on a printed circuit board, or the like to connect two or more components. The connection can be magnetically inductive, for example, stimulating the flow of current from a transformer secondary coil by passing a current through a primary coil inductively coupled to the secondary coil. The connection can be electro-magnetic, for example by controlling current flow through a relay contact via an independent relay coil such that passage of a current through the relay coil can magnetically open and close the relay contact.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
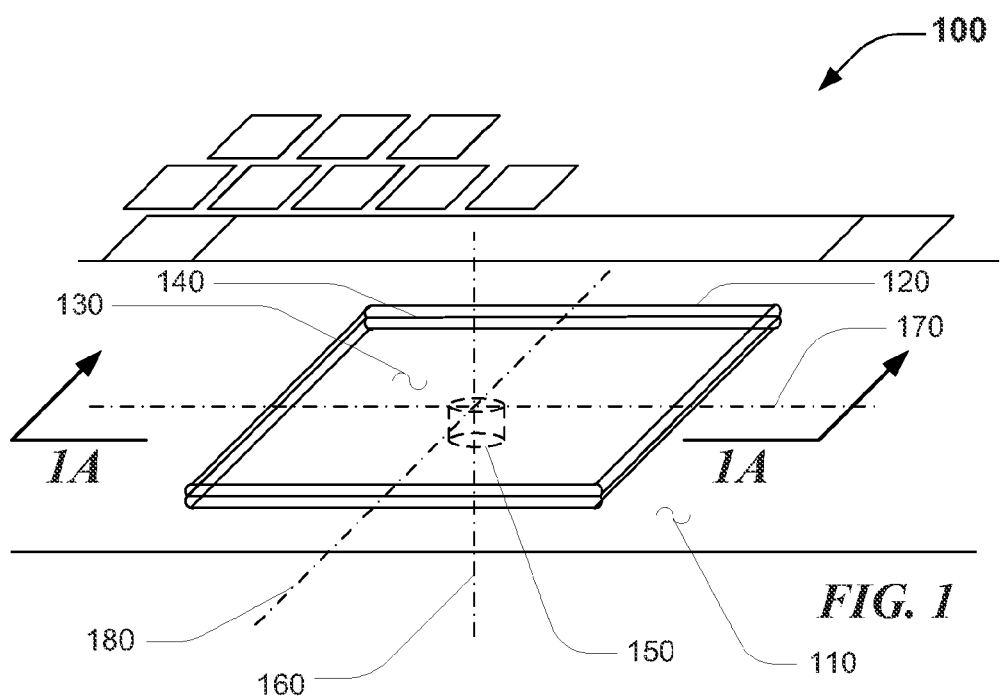
FIG. 1 depicts an upper perspective view of an illustrative gyroscopic input apparatus, according to one or more embodiments described herein.
Figure 1A:
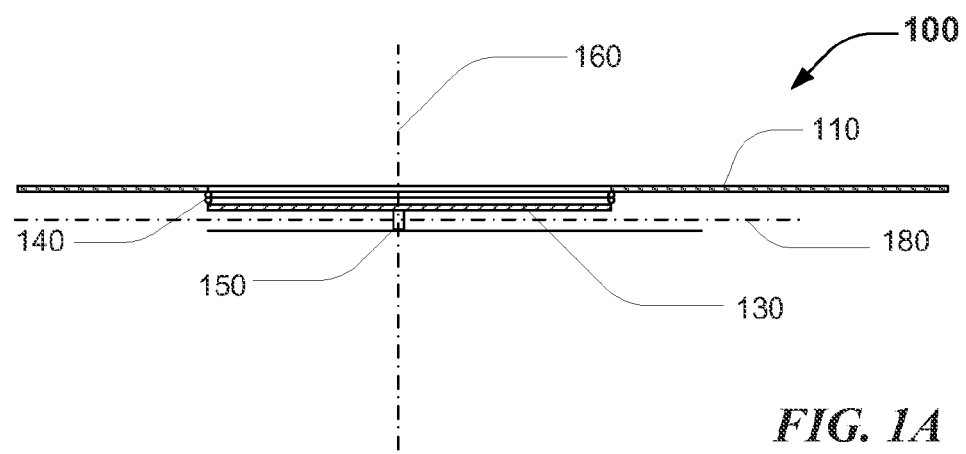
FIG. 1A depicts a cross-sectional view of the illustrative gyroscopic input apparatus depicted in FIG. 1, along sectional line 1A-1A, according to one or more embodiments described herein.

FIG. 1 depicts an upper perspective view of an illustrative gyroscopic input apparatus 100, according to one or more embodiments. FIG. 1A depicts a cross-sectional view of the illustrative gyroscopic input apparatus depicted in FIG. 1, along sectional line 1A-1A, and is included to provide a better perspective of an exemplary gyroscopic input apparatus 100 according to one or more embodiments. The illustrative gyroscopic input system depicted in FIG. 1 can include a rigid surface 110 having an aperture 120 disposed therein. An input surface 130 can be disposed at least partially within the aperture 120. A flexible member 140 can be used to attach or otherwise connect the input surface 130 to the rigid surface 110.

A gyroscopic sensor 150 can be disposed proximate the input surface 130. In one or more embodiments, the gyroscopic sensor can be operably connected to the input surface 130. In one or more specific embodiments, the gyroscopic sensor can be physically attached to the input surface 130, for example by chemical or mechanical bonding to one or more sides or surfaces forming the input surface 130. In one or more embodiments, the gyroscopic sensor 150 can be an electromechanical device adapted to detect motion along one or more orthogonal axes, for example the set of three principal orthogonal axes labeled 160, 170, and 180 depicted in FIG. 1.

As used herein, the term "orthogonal axes" and axes that are determined to be "orthogonal" refers to any set of three axes where the first axis and the second axis define a plane laying at a right angle to the third axis. Any force applied in a space defined by a set of three orthogonal axes can be reduced to a set of force vectors acting along (i.e. co-linear with) each of the three principal axes defining the space. For example, in an orthogonal space defined by an x-axis, a y-axis, and a z-axis, any force (F) applied within the space can be reduced to an x-component ($F_x$), a y-component ($F_y$), and a z-component ($F_z$).

The rigid surface 110 can be any device, and system, or any combination thereof, suitable for providing a stable mounting surface for the input surface 130. The rigid surface 110 can include, for example, an enclosure or housing for an electrical device. The rigid surface 110 can include all or a portion of an enclosure partially or completely surrounding an electronic device. Exemplary, non-limiting, examples of rigid surfaces can include portable computing devices such as a laptop computer, a netbook computer, an ultraportable computer, and the like. Similarly, a suitable rigid surface 110 can be provided in smaller form-factor electronic devices such as handheld gaming systems, personal data assistants ("PDAs"), cellular communication devices, and the like. A regular or irregular shaped aperture 120 can be disposed in, on, or about the rigid surface 110.

The aperture 120 can be defined by one or more exterior edges formed within the rigid surface. The aperture 120 can be of any shape, geometry, or configuration. In one or more embodiments, the aperture 120 can provide a passageway or opening between the exterior of an enclosure to the interior of the enclosure. In one or more embodiments, the aperture 120 can be generally square or rectangular aperture, formed by four distinct edges terminating in sharp, filleted, or chamfered corners as depicted in FIG. 1. An input surface 130 can be disposed proximate all or a portion of the aperture 120.

The input surface 130 can have any size, shape, or configuration. In one or more embodiments, the input surface 130 can be of similar proportion to the aperture 120. In one or more embodiments, the input surface 130 can be disposed proximate the bottom of the rigid surface 110 as depicted in FIGS. 1 and 1A, in a location accessible to a user from the top of the rigid surface 110.

The terms "top," "bottom," "up," and "down" and other like terms used herein refer to relative positions to another and are not intended, nor should be interpreted, to denote a particular absolute direction or spatial orientation. For example, a feature described as being on the "bottom" surface of a device could be on the "top" surface or a "side" surface of the device if the device is rotated or inverted; such rotation or inversion is envisioned to be within the scope of one or more claimed embodiments described herein.

The term "user", as used herein, includes but is not limited to one or more persons, software, computers or other devices, or combinations of these.

In one or more embodiments, all or a portion of the input surface 130 can incorporate one or more "touch-sensitive" surfaces, including, but not limited to a capacitive touchpad, a resistive touch panel, a surface acoustic wave touch panel, a projected capacitance touch panel, an infrared touch panel, a strain gauge touch panel, an optical imaging touch panel, a dispersive signal technology touch panel, or an acoustic pulse recognition touch panel. The use of a touch-sensitive surface can enable the input surface 130 to generate a signal output proportional to the location and movement of an object such as a finger or stylus, disposed near or upon the input surface 130.

The input surface 130 can be operably connected or otherwise attached to the rigid surface 110 via a flexible member 140. The flexible member 140 can permit the limited displacement of the input surface 130 with respect to the rigid surface 110. In one or more embodiments, the flexible member can permit the displacement of the input surface 130 in any direction within the orthogonal space defined by the principal axes 150, 160, 170. In one or more embodiments, all or a portion of the flexible member 140 can be attached to the edge forming the aperture 120, and all or a portion of the flexible member 140 can be attached to an exterior edge of the input surface 130, thereby permitting the displacement of the input surface 130 with respect to the rigid surface 110.

The flexible member 140 can be of any material suitable for permitting the displacement of the input surface 130. In one or more embodiments, the flexible member 140 can be an elastomeric material, for example a double-shot rubber, an ethylene propylene diene monomer ("EPDM"), polypropylene, polyethylene, and the like. In one or more embodiments, the flexible member 140 can be a thin rigid member, for example a thin polycarbonate member, a thin polystyrene member, a thin metallic member, a carbon fiber member, and the like.

The gyroscopic sensor 150 can include any device, any system, or any combination of systems and devices suitable for measuring displacement along the three orthogonal axes, 160, 170, and 180. In one or more embodiments, the gyroscopic sensor 150 can provide at least one sensor output proportional to its displacement. For example, if a displacement force (F) is applied to the gyroscopic sensor 150 a sensor output can be generated proportionate to the displacement forces along the three principal axes ($F_x$, $F_y$, and $F_z$).

In one or more embodiments, the gyroscopic sensor 150 can be disposed proximate the bottom of the input surface 130. Disposal of the gyroscopic sensor 150 proximate the input surface 130 can permit the gyroscopic sensor to generate at least one sensor output proportional to the displacement of the input surface 130 along all three orthogonal axes 160, 170, and 180.

Figure 2:
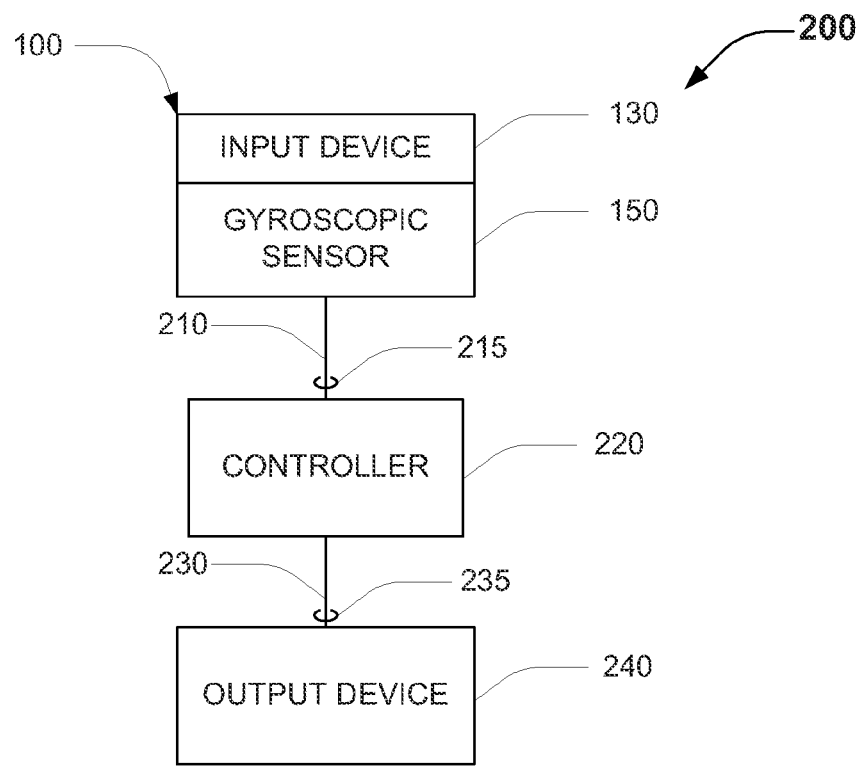
FIG. 2 depicts a schematic of an illustrative gyroscopic input system, according to one or more embodiments described herein.

FIG. 2 depicts a schematic of an illustrative gyroscopic input system 200, according to one or more embodiments. The system 200 can include an input surface 130 operatively coupled to a gyroscopic sensor 150. The gyroscopic sensor 150 can, in turn, be communicatively coupled to a controller 220. In one or more embodiments, the sensor output 210 can be communicated or otherwise transmitted to the controller 220 via one or more communications conduits 215. The controller 220 can generate a control output 230 that can be communicated or otherwise transmitted to an output device 240 via one or more communications conduits 235.

In one or more embodiments, the input surface 130 and operatively connected gyroscopic sensor 150 can be used to provide user input to an electrical device, for example a machine controller or computer. When the user applies a force to the input surface 130, the gyroscopic sensor can generate a sensor output 210 that can be proportionate to the magnitude and direction of the user applied force. In other words, the greater the force applied by the user to the input surface 130, the greater the magnitude of the sensor output 210, and conversely, the lesser the force applied by the user to the input surface 130, the lesser the magnitude of the sensor output 210.

In one or more embodiments, the sensor output 210 can be three individual signals, each communicating or otherwise transmitting the displacement force applied along one of the three principal axes 160, 170, and 180, i.e., $F_x$, $F_y$, and $F_z$. In one or more embodiments, the sensor output can be one or more multiplexed signals communicating or otherwise transmitting the displacement force applied along each of the three principal axes 160, 170, and 180, i.e., $F_x$, $F_y$, and $F_z$. Accordingly, the one or more communications conduits 215 can include any number of wireless, wired, or optical channels required to communicate or otherwise transmit the sensor output 210 to the controller 220.

The sensor output 210 can be supplied to the controller 220. The controller 220, based in whole or in part upon the content of the sensor output 210 can provide a control output 230. For example, within the controller 220 the control output 230 can be generated based upon one or more preloaded routines or algorithms disposed within the controller 220. In one or more embodiments, the control output 230 can be generated in whole or in part based upon one or more user inputted parameters. The control output 230 can be transmitted from the controller to one or more output devices 240 via one or more conduits 235.

The output device 240 can be any system, any device, or any combination of systems and devices adapted to receive the control output 230 generated by the controller 220. The output device 240 can include any machine or industrial device, for example a milling machine. Using an exemplary milling machine, the cutting tool speed, direction, and depth can be controlled by a user based upon input provided to the controller 220 via the input surface 130. For example, a user can apply a force along axis 180 to move the cutting tool forward and backward. Similarly, the user can apply a force along axis 170 to move the cutting tool left and right. The magnitude of the displacement along axes 170 and 180 can, in one or more embodiments, control one or more cutting tool parameters, for example the speed of the cutting tool along the respective axis 170, 180. A displacement along axis 160 can control an additional cutting tool parameter, for example the depth of the cutting tool.

Figure 3:
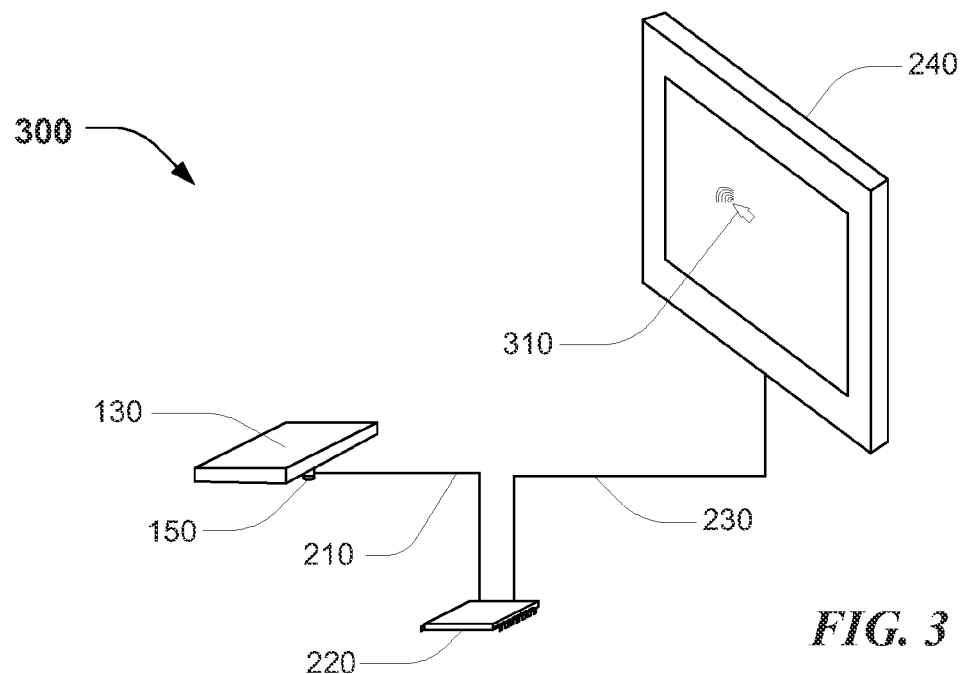
FIG. 3 depicts a schematic of another illustrative gyroscopic input system, according to one or more embodiments described herein.

FIG. 3 depicts a schematic of another illustrative gyroscopic input system 300, according to one or more embodiments. In one or more embodiments, the system 300 can include an input surface 130 having an operatively connected gyroscopic sensor 150. The sensor output 210 can be provided to a controller 220, for example a graphical processing unit ("GPU") disposed within a computing device. The controller 220 can transmit a control output 230 to an output device 240, for example a liquid crystal display ("LCD") device disposed at least partially within a computing device. In one or more embodiments, the input surface 130 and gyroscopic sensor 150 can be used to control one or more functional aspects of a display feature 310, for example a pointer or cursor, presented to a user via the output device 240.

In one or more embodiments, one or more features of the display feature 310 can be controlled by a user based upon the user's application of force to the input surface 130. For example, the user can apply a force along axis 180 to move the display feature 310 upwards and downwards on the output device 240. Similarly, the user can apply a force along axis 170 to move the display feature 310 left and right on the output device 240. The magnitude of the displacement along axes 170 and 180 can, in one or more embodiments, control one or more display feature parameters, for example the speed of the display feature 310. A displacement along axis 160 can control an additional display feature parameter, for example the size or shape of the display feature 310. In one or more embodiments, a displacement along axis 160 can access one or more operating system features, for example a "scroll" feature to scroll between open "windows" on a user's desktop.

Figure 4:
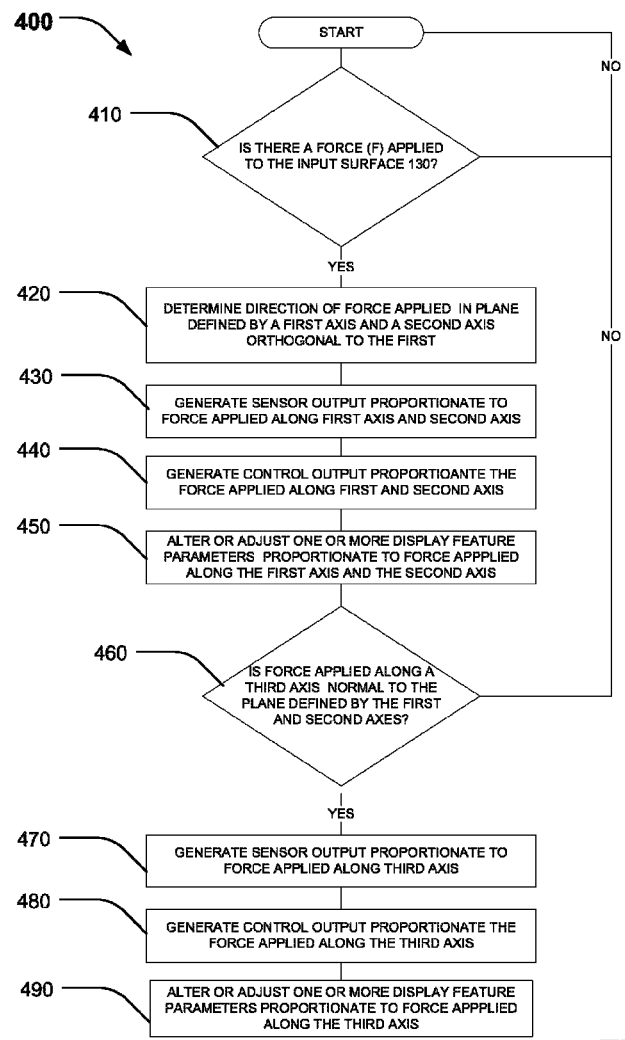
FIG. 4 depicts a logic flow diagram for an illustrative gyroscopic input system, according to one or more embodiments described herein.

FIG. 4 depicts a logic flow diagram 400 for the illustrative gyroscopic input system 300 depicted in FIG. 3, according to one or more embodiments. The method can commence at 410 with the detection of a force (F) applied by a user to the input surface 130. If force (F) is detected at 410, the method repeats until a force (F) is detected.

At 420 the force (F) components directed along axes 170 and 180 can be determined. For ease of discussion and as an aid to clarity, consider the force applied along axis 170 to be $F_x$ and the force applied along axis 180 to be $F_y$. The components $F_x$ and $F_y$ can, in one or more embodiments, be determined based upon the displacement of the gyroscopic sensor 150 from a "neutral" position, where the "neutral" position is the position of the gyroscopic sensor 150 in the absence of any applied force.

At 430 the gyroscopic sensor can generate one or more sensor outputs 210 in response to the application by the user of force F to the input surface 130. The sensor output 210 can include one or more signals proportionate to the force $F_x$ applied along axis 170 and force $F_y$ applied along axis 180. In one or more embodiments, the sensor output 210 can be transmitted or otherwise communicated to the controller 220.

At 440 the controller 220 can generate one or more control outputs 230 based in whole or in part upon the sensor output 210 provided by the gyroscopic sensor 150. In one or more embodiments, all or a portion of the control output 230 can be based upon the force $F_x$ applied by the user along axis 170 and force $F_y$ applied by the user along axis 180.

At 450, all or a portion of the control output 230 can be used to control the location of, or otherwise displace one or more display features 310 displayed on the output device 240. In one or more specific embodiments, the control output 230 can control one or more display feature properties based upon the magnitude of the user applied force $F_x$ applied by the user along axis 170 and force $F_y$ applied by the user along axis 180. For example, in one or more specific embodiments, the speed of the display feature 310 can increase when the user applies a greater force F to the input surface 130.

At 460, the method can determine whether the user has applied a force $F_z$ along axis 160, i.e. normal to the input surface 130. Similar to force $F_x$ and force $F_y$, force $F_z$ can, in one or more embodiments, be determined based upon the displacement of the gyroscopic sensor 150 from the "neutral" position.

At 470 the force (F) components directed along axis 160 can be determined. The components $F_x$ and $F_y$ can, in one or more embodiments, be determined based upon the displacement of the gyroscopic sensor 150 from a "neutral" position, where the "neutral" position is the position of the gyroscopic sensor 150 in the absence of any applied force.

At 480 the gyroscopic sensor can generate one or more sensor outputs 210 in response to the application by the user of a force $F_z$ directed along axis 160 of the input surface 130. In one or more embodiments, the sensor output 210 can include one or more signals proportionate to the force $F_x$ applied along axis 170, force $F_y$ applied along axis 180, and force $F_z$ directed along axis 160. In one or more embodiments, the sensor output 210 can be transmitted or otherwise communicated to the controller 220.

At 490 the controller 220 can generate one or more control outputs 230 based in whole or in part upon the sensor output 210 provided by the gyroscopic sensor 150. In one or more embodiments, all or a portion of the control output 230 can be based upon the force $F_z$ applied by the user along axis 160.

The magnitude of the force $F_z$ applied by the user to the input surface 130 can be used to alter, adjust, affect, or control one or more display feature 310 parameters. In one or more embodiments, one or more operating system parameters, for example the ability to scroll through open "windows" on a user's desktop, can be altered, adjusted, or otherwise affected proportionate to the magnitude of the force $F_z$ applied by the user along axis 160. In one or more embodiments, one or more software parameters, for example the ability to scroll through layers in a computer-aided design ("CAD") image, can be altered, adjusted, or otherwise affected proportionate to the magnitude of the force $F_z$ applied by the user along axis 160.

Figure 5:
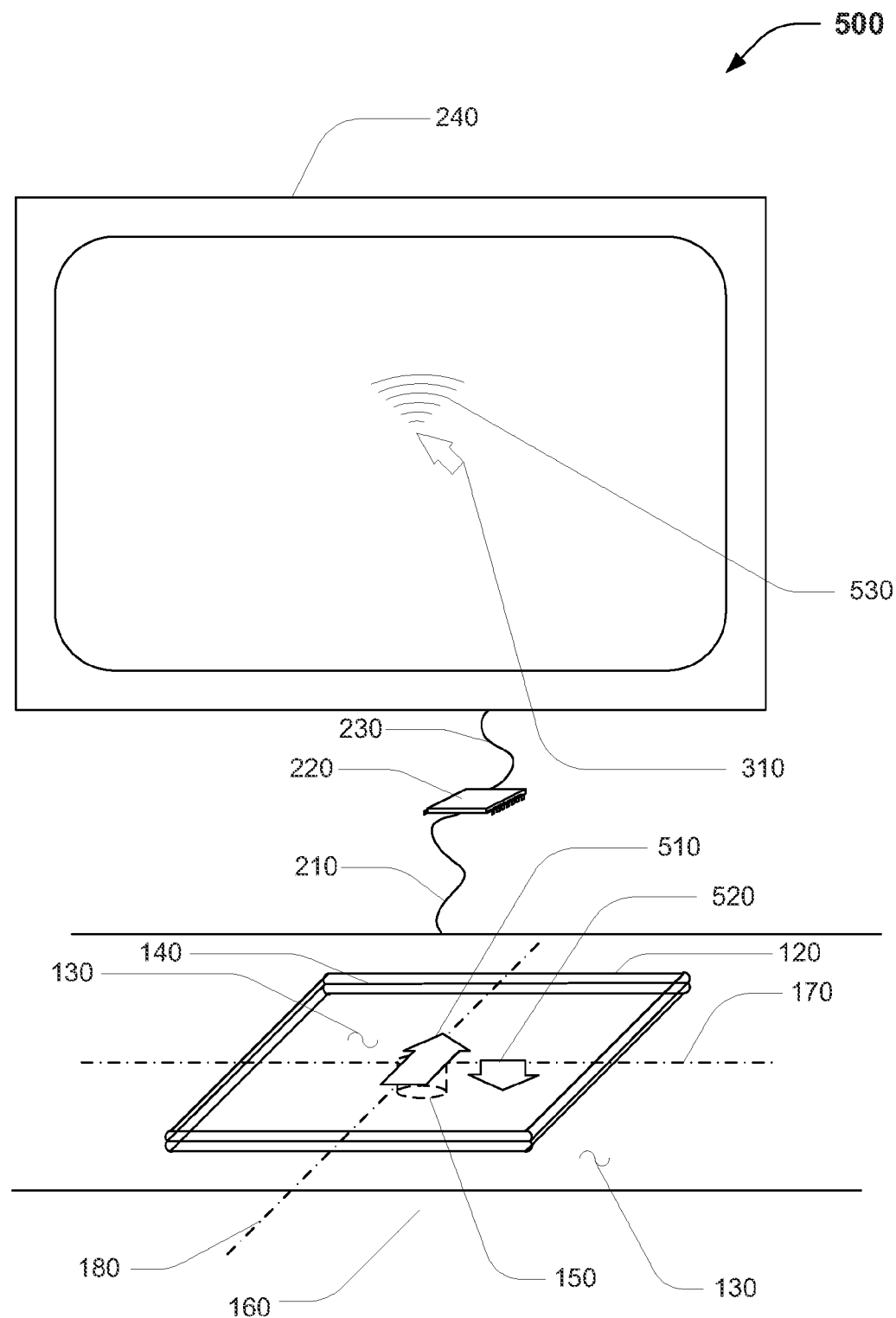
FIG. 5 depicts a schematic of an illustrative gyroscopic input system employing the exemplary logic depicted in FIG. 4, according to one or more embodiments described herein.

FIG. 5 depicts a schematic of an illustrative gyroscopic input system 500 employing the exemplary logic 400 depicted in FIG. 4, according to one or more embodiments. In one or more embodiments, the system 500 can include an input surface 130 operatively connected to a gyroscopic sensor 150, attached to a rigid surface 110 via one or more flexible members 140. In one or more embodiments, the input surface 130 can be a touchpad disposed in a portable computing device such as a laptop, netbook, ultraportable computer, PDA, handheld gaming system, or cellular device.

In response to a user applied force 510, 520 on the input surface 130, the gyroscopic sensor 150 can provide a sensor output 210 to a controller 220. In turn, the controller 220 can provide a control output 230 to an output device 240, for example an LCD display device disposed in a portable computing device such as a laptop, netbook, ultraportable computer, PDA, handheld gaming system, or cellular device. In response to the control output 230, one or more display feature 310 parameters can be altered, adjusted, affected, or controlled 530 based upon the user supplied force on the input surface 130.

In one or more embodiments, a user can input an exemplary force 510 ($F_y$) along axis 180. In addition the user can simultaneously or sequentially input an exemplary force 520 ($F_z$) along axis 160. In response to the force applied along axes 160 and 180, the gyroscopic sensor 150 can be displaced from the "neutral" position a distance proportionate to the force applied along the respective axis 160, 180. The gyroscopic sensor 150 can generate a sensor output 210 which is transmitted or otherwise communicated to the controller 220 via one or more conduits 215.

Within the controller 220, the sensor output can be altered, adjusted, or otherwise transformed to provide one or more control outputs 230. The one or more control outputs 230 can be transmitted via one or more conduits 235 to the output device 240. In one or more specific embodiments, the controller 220 can include a dedicated or a shared Graphical Processing Unit ("GPU"), the one or more conduits 235 can represent a video bus, and the output device 240 can represent an LCD display, all of which can be partially or completely disposed within a portable computing device.

For example, in response to the displacement of the input surface 130 along axis 180, the display feature 310 can move upwards on the output device 240, i.e., the cursor can move vertically upwards on the LCD display. In one or more embodiments, one or more display feature parameters, for example the speed of the display feature 310, can be altered, adjusted, or otherwise affected proportionate to the magnitude of the force $F_y$ applied by the user along axis 180.

Similarly, in response to the displacement of the input surface 130 along axis 160, one or more display feature parameters, for example the opacity of the display feature 310, can be altered, adjusted, or otherwise affected proportionate to the magnitude of the force $F_z$ applied by the user to the input surface 130 along axis 160. As depicted in FIG. 5 for example, the opacity of the display feature 310 can decrease with increasing force $F_z$ applied to the input surface 130 along axis 160.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A gyroscopic input apparatus comprising:
   a rigid surface having an aperture disposed therein;
   an input surface flexibly attached to the rigid surface via a flexible member, disposed proximate at least a portion of the aperture; and
   a gyroscopic sensor operatively connected to the input surface, the gyroscopic sensor capable of measuring displacement along three orthogonal axes.

2. The apparatus of claim 1 wherein the input surface comprises a surface simultaneously displaceable in at least two of three orthogonal axes.

3. The apparatus of claim 1 further comprising a sensor output adapted to transmit at least one signal, the at least one signal proportionate to:
   displacement of the input surface along a first of the three orthogonal axes; and
   displacement of the input surface along a second of the three orthogonal axes.

4. The apparatus of claim 1;
   wherein the input surface comprises a capacitive surface, and wherein the surface can provide at least a portion of a sensor output; and
   wherein at least a portion of the sensor output is proportionate to the location of an object placed upon the surface.

5. The apparatus of claim 1, wherein the aperture comprises a four-sided figure and the input surface comprises a similar four-sided figure.

6. The apparatus of claim 1, wherein the flexible connection between the rigid surface and the input surface comprises an elastomeric compound.

7. A gyroscopic input system, comprising:
   a rigid surface having an aperture disposed therein;
   an input surface flexibly attached to the rigid surface via a flexible member, disposed proximate at least a portion of the aperture;
   a gyroscopic sensor adapted to provide a sensor output, operatively connected to the input surface; and a controller communicatively coupled to the gyroscopic sensor configured to receive the sensor output.

8. The system of claim 7, further comprising an output device communicatively coupled to the controller;
   wherein the controller is additionally configured to provide a control output; and
   wherein the output device is configured to receive the control output.

9. The system of claim 7, wherein the input surface comprises a surface simultaneously moveable in at least two of three orthogonal axes.

10. The system of claim 7, wherein the sensor output comprises at least one signal proportionate to the displacement of the input surface along at least two of three orthogonal axes.

11. The system of claim 8,
    wherein the input surface is adapted to control at least one display feature parameter; and
    wherein the rate of change of the at least one display feature parameter is proportionate to displacement of the input surface along at least one of the three principal orthogonal axes.

12. The system of claim 7;
    wherein the input surface comprises a capacitive surface, and wherein the surface can provide at least a portion of a sensor output; and
    wherein at least a portion of the sensor output is proportionate to the location of an object placed upon the surface.

13. A gyroscopic input method, comprising:
    applying a force to an input surface;
       wherein the input surface is at least partially disposed within an aperture formed within a rigid surface; and
       wherein a gyroscopic device is operatively connected to the input surface; and
    transmitting a sensor output from the gyroscopic device to a controller;
       wherein at least a portion of the sensor output is proportionate to the direction of the applied force; and
       wherein at least a portion of the sensor output is proportionate to the magnitude of the applied force.

14. The method of claim 13, further comprising:
    transmitting a control signal from the controller to at least one output device;
       wherein the control signal is used to control at least one display feature parameter;
       wherein at least a portion of the at least one control signal is proportionate to the direction of the input force applied to the input device;
       wherein at least a portion of the control signal is proportionate to the magnitude of the input force applied to the input device;
       wherein the portion of the control signal proportionate to the direction of the input force controls the direction of movement of the at least one display feature; and
       wherein the portion of the at least one control signal proportionate to the magnitude of the input force controls the rate of movement of the at least one display feature.

15. The method of claim 14,
    wherein the rigid surface, input surface, controller, and output device are disposed at least partially within a portable electronic device;
    wherein the output device comprises a display device; and
    wherein the at least one display feature comprises a pointer disposed on the display device.

* * * * *